June 16, 1953  
D. W. ENOCH  
2,642,013  
MEANS FOR CONTINUOUS SHAPING, FEEDING, AND SHEETING OF DOUGH  
Filed May 28, 1948  
3 Sheets-Sheet 1
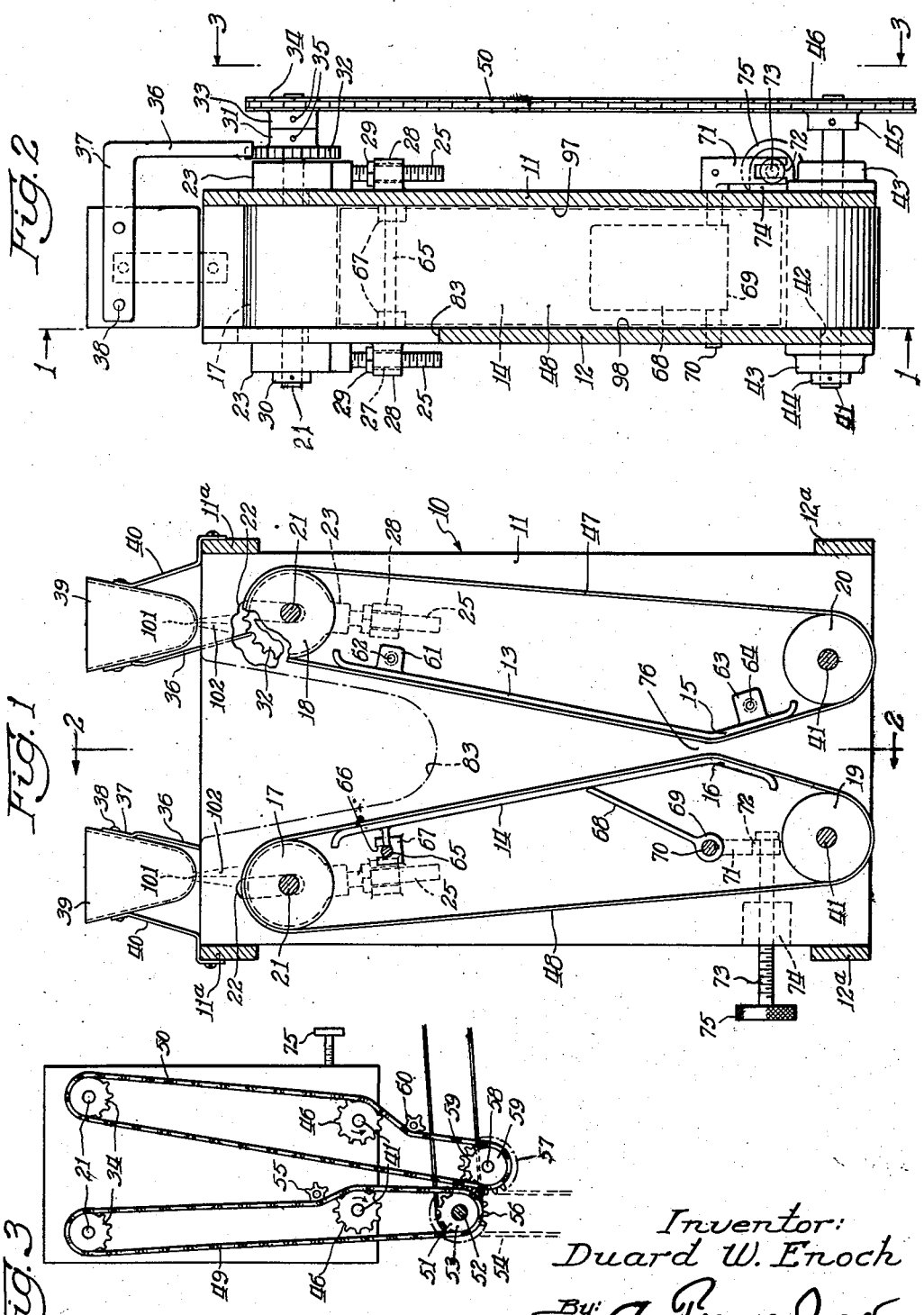
Inventor:  
Duard W. Enoch  
By: A. Trevor Jones  
Atty.

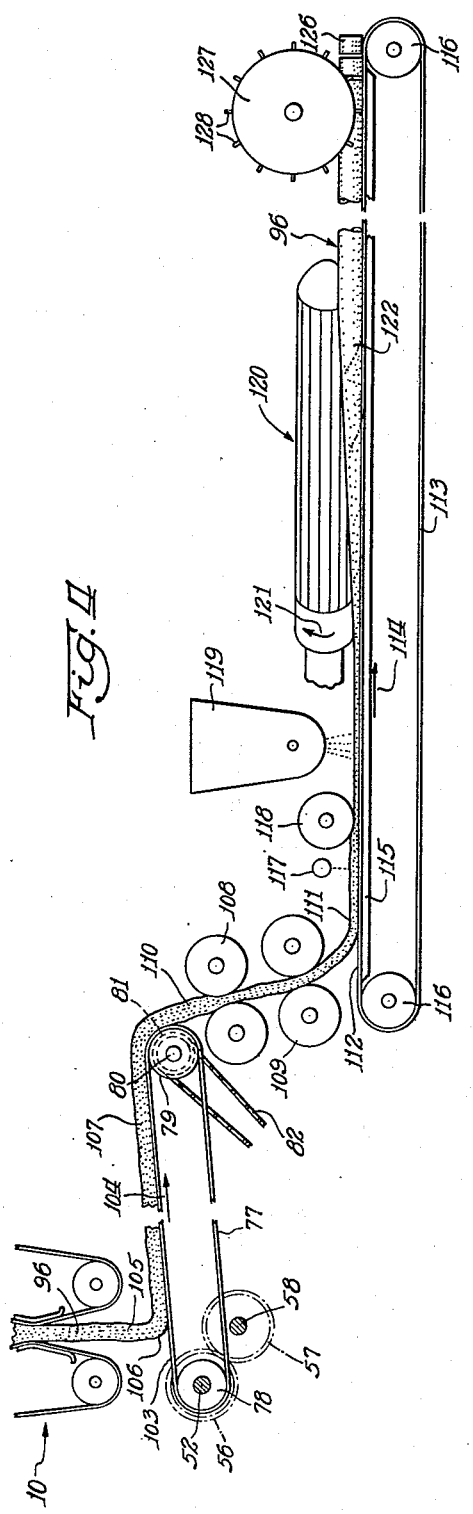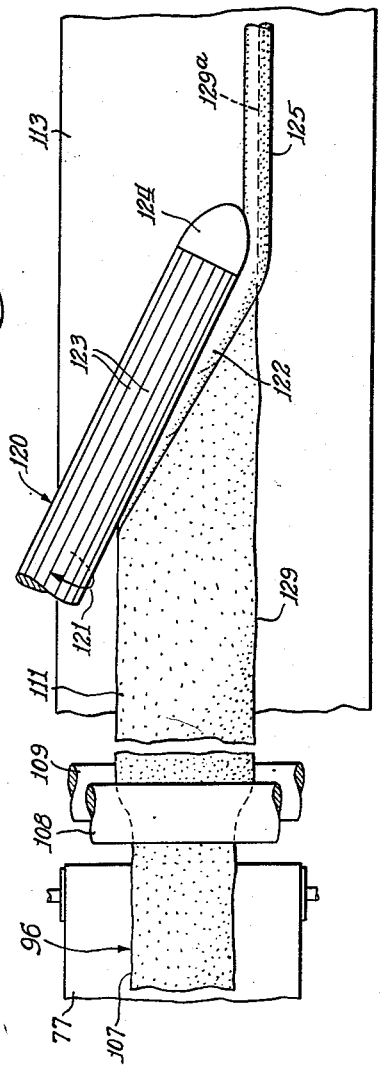

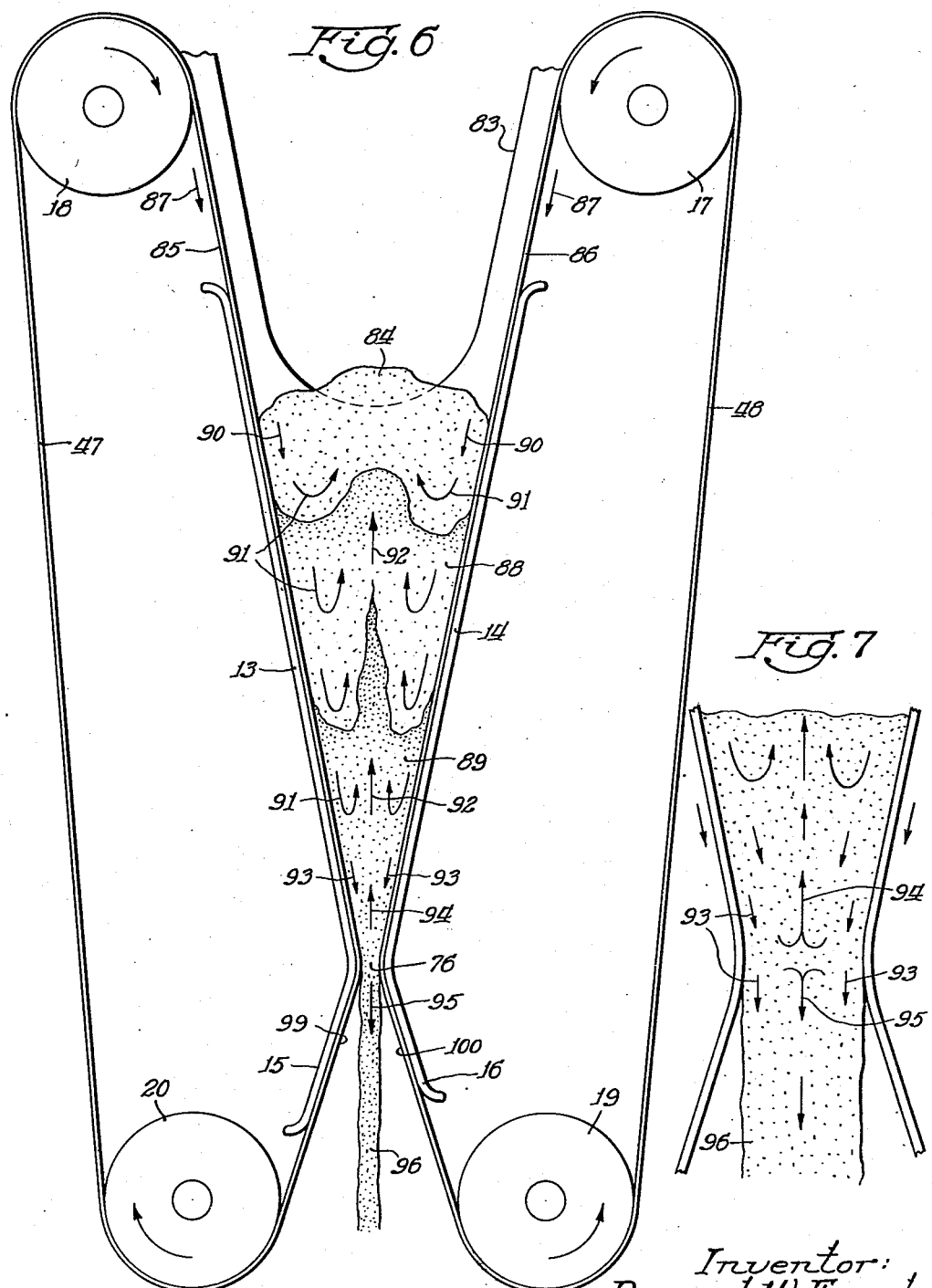

Patented June 16, 1953

2,642,013

UNITED STATES PATENT OFFICE 2,642,013

MEANS FOR CONTINUOUS SHAPING, FEEDING, AND SHEETING OF DOUGH

Duard W. Enoch, Kansas City, Mo., assignor to Interstate Bakeries Corporation, Kansas City, Mo., a corporation of Delaware Application May 28, 1948, Serial No. 29,874

12 Claims. (Cl. 107—12)

This invention relates to means for continuous shaping, feeding and sheeting of dough more particularly in commercial bakery plants where savings in time and labor costs are important and where, together with such savings, improvements in the quality and uniformity of the bakery products are sought.

The present invention is of special utility in connection with the continuous production of cinnamon buns and other bakery sweet goods in which the dough is formed into a coil, for example, as shown in the Fonken Patent Reissue No. 22,399 and in the Cohen et al. Patent No. 2,352,617. According to those prior disclosures, the dough is formed in a flat strip of indefinite length and of somewhat uniform width and thickness and is then coiled somewhat longitudinally by an oblique roller to form a continuously coiled cylinder of dough which is finally cut off in longitudinal sections for making the individual cinnamon buns. The invention however is not limited to the making of sweet goods.

The present invention provides new and useful expedients for receiving the dough which comes from the dough mixing machinery in batches or continuously and uniting separate portions of the dough continuously into an elongated strip of substantially uniform width and thickness to be continuously fed to a cutter or to a coiling mechanism, thus insuring uniformity of the dough strip together with automatic continuous scaling with a minimum of manual or mechanical working or so-called punishment of the dough.

The invention will be readily understood by reference to the following specification, taken together with the accompanying drawings, setting forth illustrative practices thereof, and in which drawings—

Figure 1 is a vertical sectional view through the novel shaping and feeding hopper following the present invention, and being a section taken on the line 1—1 of Fig. 2;

Figure 2 is a vertical section of the device shown in Figure 1 and showing both side walls of the hopper taken on the line 2—2 of Fig. 1;

Figure 3 is a side elevational view on somewhat reduced scale of the device shown in Figs. 1 and 2 and being a section taken on the line 3—3 of Fig. 2, looking at the opposite side of the hopper and showing also parts not seen in Figs. 1 and 2;

Figure 4 is a side elevational view, somewhat schematic, of illustrative dough strip forming, conveying, additional sheeting, oil and cinnamon applying, continuous coiling, and cutting mechanism following one useful application of the present invention, and showing also the dough strip itself and including the novel strip forming device shown in Figs. 1 and 2, to which the present invention is directed;

Figure 5 is a plan view of certain parts shown in Fig. 4, broken away to save space and parts being omitted for clearness of description;

Figure 6 is an enlarged view, here again somewhat schematic, and similar to Fig. 1 but looking from the same side as Fig. 3 and showing dough portions received in the hopper and passing therethrough as a continuous strip; and Figure 7 is a further enlarged fragmentary view of what is similarly shown in Fig. 6 at the point of greatest constriction of the V belts.

In the handling of dough in a continuous stream to be later cut into sections, each section to provide an individual article of bakery production, such as a loaf of bread, a cinnamon roll, or other bakery goods, one of the greatest problems encountered has been the attainment of substantial uniformity in the size and weight of the finished bakery product. It will be understood that such uniformity is highly important in commercial baking, not only for compliance with rules and regulations as to weight, but also for satisfactory operation of packaging and wrapping appliances and recurring satisfaction of the ultimate customer.

Heretofore, where the weight of the bakery product, particularly a loaf of bread, has been determined by scaling, i. e. measuring the quantity of dough, it has been done in the conventional pocket and plunger dough divider, and the punishment given the dough by this operation has required proofing of the dough subsequent thereto to allow the gases of fermentation in the dough cells to again expand and give life to the dough before the individual dough pieces so scaled for a loaf of bread are passed through a sheeter and molder where the individual piece is rolled up into a coil to be placed in a pan to provide a loaf of bread. This punishment of the dough by such conventional divider method of scaling for size of loaf disadvantageously takes some of the tenderness out of the dough.

For other bakery products, for example such as cinnamon rolls or other bakery sweet goods, where the dough is not scaled for the size of the product by a divider, it has been still necessary to punish the dough at least to a certain extent by hand forming of portions or stringers of dough which may be later scaled by hand or mechanically to provide the individual product piece. Here again, even the preliminary hand forming of the stringers, for example, gives the dough some punishment which tends to rob it of at least some of its tenderness, and, furthermore the subsequent scaling as for example from a strip which may be rolled out from such a hand-formed portion or stringer is likely to be irregular in weight due to the fact that the stringer itself as formed by hand is inevitably irregular in cross-section and density at various points therealong.

By means of the present invention, and the specific means and expedients next described for carrying it out, the disadvantages of previously employed means for scaling of dough are eliminated or at least greatly minimized in that the dough is more gently treated, requiring little if any subsequent proofing of the dough after it is formed into a continuous strip, and at the same time homogeneous cross-section and density is provided, with this more gentle form of treatment, and assuring, when mechanically scaled by a simple cutting of the strip, greatly enhanced tenderness and weight uniformity of the individual product pieces when subsequently baked, thus contributing both to packaging operations and customer satisfaction.

Referring in detail to the illustrative construction shown in the drawings, and in accordance with the present invention, a hopper 10 is provided having vertical jointly V-shaped elements and having the parallel side walls 11 and 12, which may be of generally rectangular shape and which between them provide the space and support for a pair of plates 13 and 14 which are arranged to jointly downwardly converge and then diverge as at 15 and 16 respectively whereby to provide a V-shape opening therebetween. The walls 11 and 12 are spaced apart the width of the plates 13 and 14 by a pair of upper belt drums 17 and 18, one adjacent each of the upper corners of the walls and another pair of belt drums 19 and 20, one adjacent each of the lower corners of the walls but somewhat closer together than the upper drums 17 and 18. The walls are braced by upper cross-struts 11a and lower cross-struts 12a suitably secured to the walls.

The drums 17 and 18 are each keyed to spindles 21 that pass rotatively through the walls 11 and 12 providing bearings therefor and project laterally beyond the walls at each side thereof through vertically elongated bearing slots 22 in the walls by reason of which the spindles and with them the belt drums 17 and 18 may be adjusted vertically of the walls. Supplementary bearing blocks 23, a pair for each spindle, are located exteriorly of each wall and pass the spindles rotatively therethrough, in the vicinity of the slots 22 respectively. Each bearing block 23 is adjustable and for this purpose has a depending screw-threaded leg 25 which passes downwardly through a bore 27 in a bearing and support lug 28 secured to the outer face of each wall 11 and 12 below each of the bearing blocks 23. Thus by means of the screw legs 25 the adjustment of the spindles 21 in the bearing slots 22 may be fixed and the position of the drums 17 and 18 vertically of the hopper walls varied. A lock nut 29 on each screw leg may secure the adjustment.

At one side, that is adjacent the wall 12, the spindles 21 are confined against axial movement in one direction by collars or lock washers 30, disposed on the spindles outwardly of the bearing block 23. At the other side of the hopper, that is, adjacent the wall 11, the spindles 21 have each keyed thereon, as by splined hub 31, a sprocket 32 and outwardly again of that, as by a splined hub 33, another sprocket 34, the hubs 31 and 33 desirably facing in opposite directions and abutting, to space the sprockets 32 and 34 apart. Set screws 35 on these hubs key the sprockets to the spindles for rotative movement therewith and also confine the spindles against axial movement in the direction of the lock washer 30.

In running engagement with the teeth of each of the sprockets 32 is a vibrating finger 36 of an arm 37 riveted as at 38 to a flour box 39 mounted transversely on the walls 11 and 12 over each of the belt drums 17 and 18 as by brackets 40.

At the lower ends of the walls 11 and 12 the belt drums 19 and 20 are on spindles 41 which find ordinary bearings in the walls 11 and 12 rotatively thereof as at 42, supplemented by cylindrical bearing bosses 43 fixed on each wall exteriorly thereof coaxially with the spindles 41 respectively. At one side, adjacent the wall 12, axial movement of the spindles 41 is confined by a lock washer 44, and at the other side, adjacent the wall 11, the spindles are extended laterally, co-distant with the spindles 41, to have keyed on each, by a splined hub 45, a sprocket 46.

Entrained on the belt drums are a pair of endless bands or canvas feed belts which also pass over the plates 13 and 14 in frictional sliding contact therewith, the belt 47 for the drums 18 and 20 and plate 13, and the belt 48 for the drums 17 and 19 and plate 14. For driving the drums and with them the belts 47 and 48 the sprockets 34 and 46 have meshed therewith, for each vertical pair thereof drive chains 49, for the belt 47, and 50 for the belt 48. The chain 49 passes over one of the sprockets 34 and downwardly beyond one of the sprockets 46 to pass about and mesh with the sprocket 51 keyed on a shaft 52 upon which is also keyed a sprocket 53 with which is entrained a drive chain 54 that is driven by a suitable motor reducer driving mechanism (not shown). An idler pinion 55 holds the chain 49 intermediately in mesh with the sprocket 46 therefor. For driving the other belt 48, the shaft 52 has keyed thereto on the opposite side of the hopper, a gear 56 which is in mesh with a gear 57 on a parallel shaft 58 which has keyed thereto a sprocket 59 on the same side of the hopper as the sprocket 51. The chain 50 not only passes over the sprocket 34 but also about the sprocket 59 to be driven by the latter. The chain 50 also intermediately is in mesh with a sprocket 46 and is held in driving contact therewith by an idler pinion 60. The sizes of these sprockets, as shown, are such as to cause the belts 47 and 48 to be driven at the same speed. By means of the screw legs 25, the tension of the belts may be adjusted.

The plate 13 of the shaping and feeding V arrangement is here shown fixed in position having upper mounting lugs 61 into which pass screws 62 from the walls 11 and 12 respectively, and, by lower mounting lugs 63 into which pass like screws 64. In accordance with the present invention, at least one of the pair of the plates 13 and 14 and in this instance the plate 14 is adjustable toward and from the other plate to vary the opening therebetween. For this purpose the upper end of the plate 14 has rigidly secured thereto a pintle 65 which has a pivotal seat 66 in a pair of mounting lugs 67 carried on the inner surfaces of the walls 11 and 12 respectively.

At its lower end, the plate 14 has a movable abutment support in the form of a broad arm 68 of a bell-crank lever having a knuckle or fulcrum 69 which carries a hinge pin 70 which has bearings in the walls 11 and 12. The lever arm 68 is between the walls 11 and 12 to support the lower end of the plate 14 thereagainst and is rigid with the lever knuckle 69 which is between the walls. At one side of the hopper the hinge pin 70 projects laterally beyond the wall 11, where the hinge pin 70 has another smaller lever arm 71 rigid therewith and depending alongside of the wall 11. For actuating the bell-crank lever, the lower end of the lever arm 71 is articulated as at 72 with one end of an adjusting screw rod 73 which passes through an interiorly threaded lug 74 on the outer surface of the wall 11 and terminates in a knurled knob 75.

By rotation of the knob 75 in one direction or the other, the bell-crank lever arm 71 is pushed away from or pulled toward the screw drive lug 74, and, simultaneously, the broad lever arm 68 of the bell-crank is moved to more or less vertical position, to vary the distance apart at their point of greatest approach 76 of the plates 13 and 14. Gravity maintains the lower end of plate 14 in contact with bell-crank arm 68.

Just below the hopper 10 is located one end of an endless conveyor belt 77 which is entrained on a belt drum 78 that is carried on the shaft 52 but turns freely independently of the shaft. At the other end which is spaced away from the hopper 10 and slightly upwardly inclined from the shaft 52, the belt 77 passes around another belt drum 79 which is keyed on a shaft 80 to which is also keyed a sprocket 81 that is driven by chain 82 from a source of power and preferably another separate motor reduced mechanism (not shown).

It will be seen that one of the walls 11 or 12, and in this instance the wall 12, is cut away as at 83 to provide access for depositing dough in the hopper and also for limiting the amount of dough which may be suitably deposited therein at a given time. As best seen in Fig. 6, lumps or pieces of dough such as 84 are deposited in the hopper, these pieces being cut off to any approximately suitable size from a batch of dough which may be brought to the hopper 10 directly from the dough mixing apparatus of the bakery plant. When the belts 47 and 48 are running or are started up, the inner runs 85 and 86 of these belts respectively pass downwardly over the plates 13 and 14 respectively in the direction of the arrows 87. Assuming that there are other pieces of dough such as 88 and 89 already in the hopper, previously deposited, the outer edges of each of these pieces, which are in contact with the inner runs of the feed belts, will similarly move downward as indicated by the arrows 90, and then as they encounter the dough pieces next below, and being restrained by the increasingly narrower cross-section of the hopper by reason of the taper of the feed belts, the dough of the pieces tends to move upwardly again toward the middle of the piece as indicated by the arrows 91. As more and more dough is refused along the center vertical line of the hopper, while the dough in contact with the feed belts still continues to move downwardly, the movement of the central part of the dough in the opposite direction or upwardly is increased as indicated by the arrows 92, causing the dough pieces to knit together by a so-called "boiling" action.

This so-called "boiling" action continues to approximately substantially the point of narrowest constriction of the feed belts as at 76 where here again the sides of the dough are moving downwardly as indicated by the arrow 93 while a central part of the dough is still moving upwardly as indicated by the arrow 94, there being still some refusal of the dough which cannot pass through the point of greatest constriction 76 and the line of least resistance being downward for the dough at the sides of the plates and upward for the dough at the center of the dough mass. Some compression of gases in the dough contributes to causing it to seek escape in the direction of least resistance. At about the point 76, therefore, there is a quick reversal of direction of the dough at the middle of the mass, the direction of least resistance for all of the dough being now downwardly and as indicated by the arrow 95. The dough therefore emerges from the most constricted portion of the hopper as a continuous strip 96 substantially uniform and homogeneous in cross-section and density, the dough having been gradually and gently shaped to the uniform cross-section desired by the unique V-belt arrangement, while at the same time being continuously fed for subsequent treatment. The strip 96 may be, say, one-half inch thick and four inches wide.

If a shape of a different cross-section such as a thicker or thinner strip be desired, the distance between the plates 13 and 14 may be increased or decreased in this instance as desired. If a wider strip were desired, a hopper with greater distance between the walls 11 and 12 could be substituted. It will be understood that the thickness of the strip 96 is determined by the distance apart of the inner runs 85 and 86 of the belts 47 and 48 at their point of greatest constriction 76 and that this dimension may be varied by the hand knob 75. Also it will be understood that as the hopper is here constructed the width of the strip 96 is fixed and predetermined by the distance apart of the hopper walls 11 and 12. The dough, in moving downwardly along the plates 13 and 14 with the inner runs 85 and 86 of the feed belts is in frictional engagement with the inner surfaces 97 and 98 of the hopper walls 11 and 12, and, to minimize friction thereat, these surfaces 97 and 98 are desirably coated with some anti-friction material. Paraffin has been found suitable for this purpose. To produce a wider strip, with greater distance between the walls 11 and 12, less friction proportionately to the size of the dough strip would occur at the walls, and consequently, smoother action.

It may be that some tendency of the dough to stick to the canvas feed belts 47 and 48 may be encountered and to prevent such sticking action, if it occurs, from tearing away surface bits of the dough strip 96, it has been provided, as shown in the drawings, that the plates 13 and 14, and with them the inner runs 85 and 86 of the feed belts, describe an opening somewhat in the nature of a Venturi tube, in the sense that the belts converge downwardly to the point of greatest constriction 76 and then diverge or flare outwardly again for a shorter distance, desirably in straight (i. e., nonarcuate) lines as indicated at 99 and 100. This desirably results in a gradual rather than a sharp break of the feed belts from the dough, which prevents tearing of the latter. Furthermore, sticking may be further eliminated by coating the feed belts with vegetable oil or by dusting continuously with flour or both. The flour boxes 39 have perforations 101 through which a stream of flour 102 may be shaken onto the belts respectively by reason of the jiggling of these flour boxes by the vibrator finger 36 for each of them.

in engagement with the teeth of one of the sprockets 32. The flared portions 99 and 100 also serve to retain the dough (as it tends to expand after passing the point of greatest constriction) within the confines of the belts until the belts have moved sufficiently away from the dough to remove the pressure. This contributes to the evenness of the strip.

Further in accordance with the present invention, the angle which each of the plates 13 and 14 desirably makes with the vertical is of the order of about 10 or 12 degrees providing an included angle between the plates of about 20 degrees. As at present advised this angle has been found satisfactory in the installation here specifically described and is preferred where individual pieces of dough are started with, since it causes sufficient so-called "boiling" action to knit the pieces into a continuous strip as here shown having no perceptible joints therein, without creating too much "boiling." It is desirable to maintain a dough level say up to the cut-out 83, in the hopper, to enable sufficient "boiling" to occur to effect a knitting action. It will be seen that the nearer the feed belts are to parallel relationship the less "boiling" would occur before the dough is discharged. Since the hopper of the present invention might be used to produce a uniform continuous strip from a continuous strip of dough of less uniform and larger cross-section, the angle between the feed belts might be less for such latter purpose, since less so-called "boiling" action would be required than where individual gobs or pieces of dough must be knitted together. Since the feed belts 47 and 48 move with the dough, the action on the dough is gentle, keeping the dough tender.

As the dough strip 96 passes downwardly out of the hopper 10 it is deposited, as shown in Fig. 4, upon the upper run 103 of the endless conveyor belt 77, to move on the conveyor belt 77, as indicated by the arrow 104. The speed of the belt 77 may be controlled to cause this belt to run at a speed such that there is a straight downward run of the dough strip as at 105 causing it to emerge from the feed belts midway therebetween and then causing it to define a somewhat sharp right angle as at 106 as it is picked up by the upper run 103 of the conveyor belt 77 and travels thereon to the right in Fig. 4, or in the direction of the arrow 104.

One of the important advantages of the present invention is that the dough can be fed substantially directly to the strip forming V-elements from the bakery dough mixer and without requiring any preliminary sheeting or any intermediate rest period as is necessary where dough is scaled by a mechanical or manual dividing operation, and that, moreover, the V-shape shaping and feeding means works better on dough which has not had a preliminary rest period after being mixed. Dough which is fed to the hopper substantially immediately after it is mixed contains a minimum volume of gases of fermentation, and it has been found that the less gas the dough contains at this stage the smoother and more uniform is the resulting dough strip emerging from the V-elements.

Conversely, the dough strip which is formed as here described, not having undergone the punishment of divider mechanical or manual scaling but having been more gently treated by the V-shape shaping and feeding means, with its moving feed belts moving with the dough, has not had the gases of fermentation therein too greatly compressed. Consequently the dough of the strip advantageously does not require an intermediate rest period or proof after it leaves the V-hopper and before it is subsequently scaled for individual bakery product pieces. For this reason the conveyor belt 77 need not be of great extent but need be only of sufficient length to permit the dough strip to adjust itself to its new direction of movement as at 107 on the upper run 103 of the belt 77 and preparatory to being led as here shown, into a plurality of pairs of sheeter rolls 108 and 109 through which the dough strip again passes downwardly as at 110 and from which it emerges as at 111 onto the upper run 112 of another endless conveyor belt 113 upon which it travels in the direction of the arrow 114.

As best seen in Fig. 5, the dough strip 96 as it emerges at 111 from the lower pair of sheeter rolls 109, is somewhat thinner and somewhat wider than in the form in which the dough strip emerges from the V-hopper as at 105 and 107. The cross-sectional dimension of the dough strip 96 at 111 may be, say, ¼ inch thick and about seven inches wide. Due to the fact that by use of the novel expedients just described the dough strip 96 throughout its length and for example at the places 105, 107, and 110 has marked uniformity of cross-section and density, the same remains true of the strip 96 after it is passed through the pairs of sheeter rolls 108 and 109 and comes out in the thinner and wider form as at 111.

In the illustrative use to which the present invention as just described is here shown applicable, namely for the production of bakery sweet goods, specifically cinnamon rolls in the present instance, the conveyor 113 constitutes a working belt for treatment of the dough strip for this purpose as broadly described and claimed in the Fonken Patent Reissue No. 22,399. Accordingly, the upper run of the belt 113 passes over a table 115 at each end of which are the belt drums 116, for the belt 113. While the strip 96 is still in the flat as at 111 it may first pass under oil pipe 117 which deposits by gravity a film of vegetable oil onto the upper surface of the dough strip. This oil or shortening is further spread onto the strip surface by an idler roll 118 which also has a further smoothing action on the dough strip. Next the strip may pass under a container 119 for a cinnamon and sugar mix which may be shaken onto the dough strip surface over the vegetable oil, means not shown being provided for agitating the cinnamon-sugar mixture to cause it to drop through perforations in the lower end of the container 119 onto the strip.

Next, the dough strip with the filling ingredients just described thereon may come into contact with an oblique coiling or curling roller 120 as shown in the said Fonken and Cohen et al. patents, which by mechanism not here shown is caused to rotate in the direction of the arrow 121, or a direction somewhat opposed to the movement of the dough strip while extending more nearly in the direction of movement of the conveyor belt upper run 112 than in a direction at right angles thereto, and which curling roller coils the dough strip angularly in a helical or spiral as at 122. The oblique roller 120 desirably has ribs or flutings 123 thereon to assist in picking up the dough strip and a rounded or bullet-shape nose 124 at its distal end. Under the joint action of the moving conveyor 112 and the rotating oblique roller 120, the dough strip 96 leaves the oblique roller in the form of a continuous cylinder 125 of substantially uniform diameter.

Finally, the dough strip 96 in cylindrical form as at 125 may be cut transversely into relatively short sections as at 126, by a rotating squirrel-cage or mill-type cutter 127 having transverse knife blades 128 equally spaced apart thereon. The cutter 127 is caused to rotate by engagement of the blades with the conveyor belt 112 which brings the transverse blades successively down on the coiled dough strip to sever it successively to form the sections. The scaling weights of the sections 126 may be varied to some extent and adjustments for character of dough made by lessening or increasing the constriction of the feed belts at 76, if desired, by manipulation of the hand knob 75 to make a thicker or thinner strip while maintaining the same width. It will be understood that each dough section 126 may be turned up on end and a number of them put in a pan to bake to make the ultimate cinnamon rolls, the convolutions in the coiled dough being seen in the upturned surface of the section and these convolutions being emphasized by the presence therein of the cinnamon filling.

If the invention be used for the making of bread, the filling would be omitted and a cutter substituted in place of the expedients shown in Fig. 5 making longer sections suitable for standard size loaves. Also, a series of V-hoppers might be introduced, successively thinning and widening the dough strip, to a width of, say, 14 inches.

As broadly described and claimed in the Cohen et al. Patent 2,352,617, the oblique roller 120 is advantageously arranged with respect to the dough strip so that the otherwise free or final edge of the dough strip as 129 is at the bottom of the coil 125 as at 129a to be sealed by the weight of the coiled dough thereon as the latter moves along on the conveyor belt 112.

By reason of the novel continuous strip forming expedients already described herein, including the V-hopper, the dough sections 126 are of marked uniformity of size and weight, thus achieving the objects desired in this respect with enhanced simplicity and efficiency.

It will be understood that while the invention has been described in connection with dough for bakery goods, and more specifically sweet goods' dough for cinnamon rolls, it may have useful application in the forming of a continuous strip of other doughy or plastic material which is desired to be later cut into sections of uniform size and density.

The invention is not intended to be limited to details of construction or sequence of steps of operation shown for purposes of exemplification, and such changes may be made as fall within the scope of the appended claims without departing therefrom.

The invention having been described, what is here claimed is:

1. Means for continuously feeding and sheeting dough comprising, a hopper having a pair of parallel side walls and another pair of walls shaped on the principle of a Venturi tube, and endless band means moving with the dough along the last mentioned walls for moving dough through said hopper, said band means being as wide as said last mentioned walls.

2. Means for continuously shaping and feeding dough comprising a hopper having a pair of jointly V-shape walls, and a pair of continuous belts each having an inner run passing downwardly over one of said V-shape walls of the hopper, said walls converging and then diverging.

3. Means for continuously feeding and sheeting dough comprising a V-shape hopper having a pair of opposite walls arranged on the principle of a Venturi tube, a pair of continuous belts each having an inner run passing downwardly over said walls respectively, and means for driving the belts.

4. Means for continuously feeding and sheeting dough comprising a hopper having a pair of oppositely converging walls, said walls after converging then diverging, and endless band means moving with the dough arranged along said walls for moving dough continuously therethrough, said band means being as wide as said last mentioned walls.

5. Means for continuously feeding and sheeting dough comprising a hopper having a pair of downwardly converging walls, said walls after converging then diverging, a pair of continuous belts each having a downward run conforming to said walls respectively, and means for driving the belts at the same speed.

6. Means for continuously feeding and sheeting dough comprising a hopper having a pair of parallel oppositely disposed walls, a pair of plates between said parallel walls, said plates being arranged to jointly downwardly converge and then diverge, whereby to provide a V-shape opening therebetween, supporting means for the plates at their upper ends, a first of said plates being pivoted on its supporting means, a fixed abutment for a second of said plates adjacent its lower end, an adjustable abutment for said first said plate adjacent its lower end whereby to vary the distance apart of the plates adjacent their point of greatest convergence, rotatable belt drums adjacent the upper and lower ends of each plate, a continuous belt passing over each plate and its adjacent belt drums, and means for driving the belts to cause the runs of the belts contacting the plates to move downwardly in unison.

7. In means for continuously feeding and sheeting dough, in combination, a hopper having a pair of parallel side walls, a second pair of downwardly converging walls between said side walls, a pivoted hanger for one of said second walls, an abutment against which the last mentioned wall leans adjacent its lower end, an adjusting device for said abutment, whereby to vary the distance apart of said second walls at their lower ends, and moving belt means having a downward run between said second walls.

8. In means for continuously feeding and sheeting dough, in combination, a hopper having a pair of parallel side walls, a second pair of downwardly converging walls between said side walls, a pivoted hanger for one of said second walls, a bell-crank lever adjacent the lower end of the last mentioned wall, said lever having one arm supporting the lower end of said last mentioned wall, and a screw adjustment device connected with the other arm of said lever, whereby to vary the distance apart of said second walls at their lower ends, and moving belt means having a downward run between said second walls.

9. Means for continuously feeding and sheeting dough, comprising, a hopper having a pair of parallel oppositely disposed walls, a pair of plates between said parallel walls, said plates being arranged to jointly downwardly converge, whereby to provide a V-shape opening therebetween, supporting means on the parallel walls for the plates at their upper ends, a first of said plates being pivoted on its supporting means, a fixed abutment for a second of said plates adjacent its lower end, an adjustable abutment for said first plate adjacent its lower end whereby to vary the distance apart of the plates adjacent their point of greatest convergence, rotatable belt drums adjacent the upper and lower ends of each plate, a continuous belt passing over each plate and its adjacent belt drums, the upper drums being supported on vertical screw adjustment supporting means, and means for driving the drums to cause the runs of the belts contacting the plates to move downwardly in unison.

10. Means for continuously feeding and sheeting dough, comprising, a hopper having a pair of parallel oppositely disposed walls, a pair of plates between said parallel walls, said plates being arranged to jointly downwardly converge, whereby to provide a V-shape opening therebetween, supporting means for the plates at their upper ends, a first of said plates being pivoted on its supporting means, a fixed abutment for a second of said plates adjacent its lower end, an adjustable abutment for said first plate adjacent its lower end whereby to vary the distance apart of the plates adjacent their point of greatest convergence, said adjustable abutment including an abutment plate pivoted on and between said parallel walls and leaning against said first plate, an arm extending downwardly rigid with said abutment plate, a screw rod articulated with said last mentioned arm but free to rotate therein, and a screw threaded bearing for said rod, rotatable belt drums adjacent the upper and lower ends of each plate, a continuous belt passing over each plate and its adjacent belt drums, and means for driving the belts to cause the runs of the belts contacting the plates to move downwardly in unison.

11. Means for continuously feeding and sheeting dough comprising a hopper having a pair of parallel oppositely disposed walls, a cut-out being provided adjacent the upper end of one of the parallel walls to limit disposal of dough therein, a pair of plates between said parallel walls, said plates being arranged to jointly downwardly converge, whereby to provide a V-shape opening therebetween, supporting means for the plates at their upper ends, a first of said plates being pivoted on its supporting means, a fixed abutment for a second of said plates adjacent its lower end, an adjustable abutment for said first plate adjacent its lower end whereby to vary the distance apart of the plates adjacent their point of greatest convergence, rotatable belt drums adjacent the upper and lower ends of each plate, a continuous belt passing over each plate and its adjacent belt drums, and means for driving the belts to cause the runs of the belts contacting the plates to move downwardly in unison.

12. Unitary means for continuously shaping, sheeting and feeding dough, comprising, a hopper having a relatively wide upper end for receiving therein theretofore unsheeted dough, said hopper having a pair of substantially parallel relatively wide side walls, a pair of downwardly converging walls located between said side walls and forming a V-shaped opening therebetween, the side walls extending downwardly from adjacent the upper end of the hopper to the lower end of the V-shaped opening and being arranged to close the ends of said V-shaped opening, said walls providing a relatively narrow restricted opening at the lower end of said V-shaped opening elongated in a direction transverse to the side walls, a pair of endless belts mounted between said side walls each having an inner run passing downwardly over one of the converging walls through said restricted opening and in close adjacency with the side walls, the distance apart of the converging walls at their upper ends being many times the distance apart of said converging walls at said restricted opening whereby the dough is shaped to sheet form by said hopper while being fed therethrough, and means for adjusting the spacing of the converging walls at the restricted opening, said side walls being substantially wider throughout their height than the distance apart of the converging walls at various adjusted positions of said converging walls, whereby said side walls accommodate various spacings of the portions of the converging walls at the restricted opening.

DUARD W. ENOCH.

References Cited in the file of this patent

UNITED STATES PATENTS

| Number | Name | Date |
|---|---|---|
| Re. 22,399 | Fonken | Dec. 7, 1943 |
| 660,901 | Jenkins | Oct. 30, 1900 |
| 881,439 | Peters | Mar. 10, 1908 |
| 906,271 | Palmer et al. | Dec. 8, 1908 |
| 1,131,329 | Callow et al. | Mar. 9, 1915 |
| 1,270,096 | Baker | June 18, 1918 |
| 1,482,195 | Kern et al. | Jan. 29, 1924 |
| 1,762,268 | Green | June 10, 1930 |
| 2,264,115 | Grainer et al. | Nov. 25, 1941 |
| 2,472,073 | Haecks | June 7, 1949 |